United States Patent [19]

Kammeraad

[11] Patent Number: 4,716,674
[45] Date of Patent: Jan. 5, 1988

[54] ROD HOLDER ADAPTER

[75] Inventor: James A. Kammeraad, Holland, Mich.

[73] Assignee: K-Line Industries, Inc., Holland, Mich.

[21] Appl. No.: 942,216

[22] Filed: Dec. 16, 1986

[51] Int. Cl.$^4$ ............................................. A01K 97/10
[52] U.S. Cl. .................................. 43/27.4; 248/231.9; 403/227
[58] Field of Search .............................. 43/27.4, 21.2; 248/231.9, 231.91, 523, 524; 403/227

[56] References Cited

U.S. PATENT DOCUMENTS

| 3,190,594 | 6/1965 | Chion | 248/42 |
| 3,964,706 | 6/1976 | Adams | 43/21.2 |
| 3,977,118 | 8/1976 | Seymour | 43/21.2 |
| 4,014,127 | 3/1977 | Turner | 43/27.4 |
| 4,438,582 | 3/1984 | Lummis | 43/27.4 |
| 4,485,579 | 12/1984 | Hawie | 43/21.2 |
| 4,632,591 | 12/1986 | Fullenkamp | 403/227 |

FOREIGN PATENT DOCUMENTS

| 841532 | 6/1952 | Fed. Rep. of Germany | 403/227 |
| 1052130 | 12/1966 | United Kingdom | 248/231.91 |

Primary Examiner—Gene P. Crosby
Attorney, Agent, or Firm—Price, Heneveld, Cooper, DeWitt & Litton

[57] ABSTRACT

An adapter is provided for mounting fishing accessories, such as a downrigger, in the flush mounted rod holders normally provided in the gunnels or stern of a sport fishing boat. The device comprises an elongate, cylindrical sleeve which is inserted axially in the flush mounted rod holder. The elongate sleeve is provided with a distal end and a proximate end disposed within the rod holder. First and second elastomeric rings are disposed on the distal and proximate ends of the sleeve. Distal and proximate end plugs are provided which are slidably received in the distal and proximate ends of the elongate sleeve. An accessory mounting plate is disposed on a portion of the proximate end plug which extends above the flush mounted rod holder. A threaded fastener actuated by a hand knob connects the distal and proximate end plugs for axially adjusting the plugs and compressing the first and second elastomeric rings. Axial compression of the elastomeric rings causes the rings to radially swell and firmly engage the walls of the rod holder thus securely fixing the adapter in the rod holder.

10 Claims, 2 Drawing Figures

ROD HOLDER ADAPTER

BACKGROUND OF THE INVENTION

The invention relates generally to mounting devices for attaching accessories to a fishing boat, and more particularly, is directed to a device for mounting trolling tackle in the flush mounted rod holders normally provided in the gunnels or stern of a sport fishing boat.

It is often necessary to mount fishing accessories on the gunnels or stern of a sport fishing boat. Two such common accessories are known as a downrigger and a top trolling device. A downrigger comprises a stout reel and boom for lowering a large weight overboard to the desired depth at which the fisherman wishes to troll his lure. The lure and a length of fishing line is attached to a release disposed on the downrigger weight and the downrigger reel is used to lower the weight and the fishing lure to the desired depth. In a top troller or teaser troller device, a stout reel and an upright boom are provided for flying a kite behind the boat. The fishing line is attached to a line release on the kite and a bait fish is dangled on the surface of the water after the kite is lofted and flown with the top troller. Normally, these devices also include rod holders for receiving the butt ends of the fishing rods that are used to retrieve the fish. In the past, these devices have generally been mounted on boats with mounting plates which are attached to the boat by drilling, tapping or otherwise marring the surface of the boat. Once the mounting plate is attached to the boat with suitable fasteners, the trolling device is releasably secured thereto with a plurality of thumb screws. Other techniques involve a rail mount which is bolted to a side rail or the like. However, many fishing boats do not have rails at the rear of the boat where it is most desirabale to fish. Further, these rail mounts are inconvenient to remove from the railing and even when the trolling device is removed therefrom, the rail mount generally remains, providing a potential hazard or impediment to the occupants of the boat and presenting an aesthetically displeasing structure on the railing of the boat.

SUMMARY OF THE INVENTION

These and other problems in the prior art are solved by provision of a rod holder adapter for mounting fishing accessories on the gunnels and stern of a sport fishing boat in the flush mounted rod holders that are normally provided on such a boat. Flush mounted rod holders normally comprise a cylindrical body or tube which is embedded or mounted in the gunnels or stern of a sport fishing boat for receiving the butt end of a fishing rod. The mounting device of the present invention comprises an elongate cylindrical sleeve which is adapted for insertion axially in the cylindrical rod holder. The elongate sleeve is provided with a distal end and a proximate end, which are disposed within the rod holder. A first elastomeric ring is disposed on the distal end of the sleeve and a second elastomeric ring is disposed on the proximate end of the sleeve. A distal end plug is slidably received in the distal end of the elongate sleeve with the first elastomeric ring being disposed between the distal end plug and the distal end of the sleeve. Similarly, a proximate end plug is slidably received in the proximate end of the elongate sleeve with the second elastomeric ring disposed therebetween. A fishing accessory mount, such as a mounting plate for a downrigger or the like, is disposed on a portion of a proximate end plug which extends outside of and above the flush mounted rod holder. A threaded fastener is slidably received in the proximate end plug and threadably engages the distal end plug. A hand knob is provided for actuating the threaded fastener and thus varying the axial separation of the distal and proximate end plugs. This provides an arrangement for axially compressing the first and second elastomeric rings between the end plugs and the elongate sleeve to cause the rings to swell in a radial direction and thereby firmly frictionally engage the cylindrical walls of the rod holder. This securely mounts the device in the rod holder and provides a suitable platform for mounting a fishing accessory on the gunnels and stern of a fishing boat without marring the boat for the purpose of using threaded fasteners.

DESCRIPTION OF THE PREFERRED EMBODIMENTS

With reference to the figures, the rod holder adapter of the present invention is generally illustrated at 10. The rod holder adapter is used for mounting fishing accessories on the gunnels or stern of a fishing boat illustrated at 11, in FIG. 1. Normally, boats which are designed for sport fishing are provided with a plurality of flush mounted rod holders, one of which is illustrated at 12. The flush mounted rod holders normally comprise a cylindrical body or tube, which is embedded or mounted in the gunnels or stern of the boat. The rod holder 12 is normally installed at an angle relative to the stern 13 of the boat 11 to prevent a rod butt from being pulled therefrom once a fish strikes. Generally, such rod holders are mounted flush with respect to the top surface of the gunnel or stern at 14. Such rod holders also often include a radially extending pin 15 which is used to engage cross slots disposed in the butt of a rod or an outrigger pole.

Figure 2:
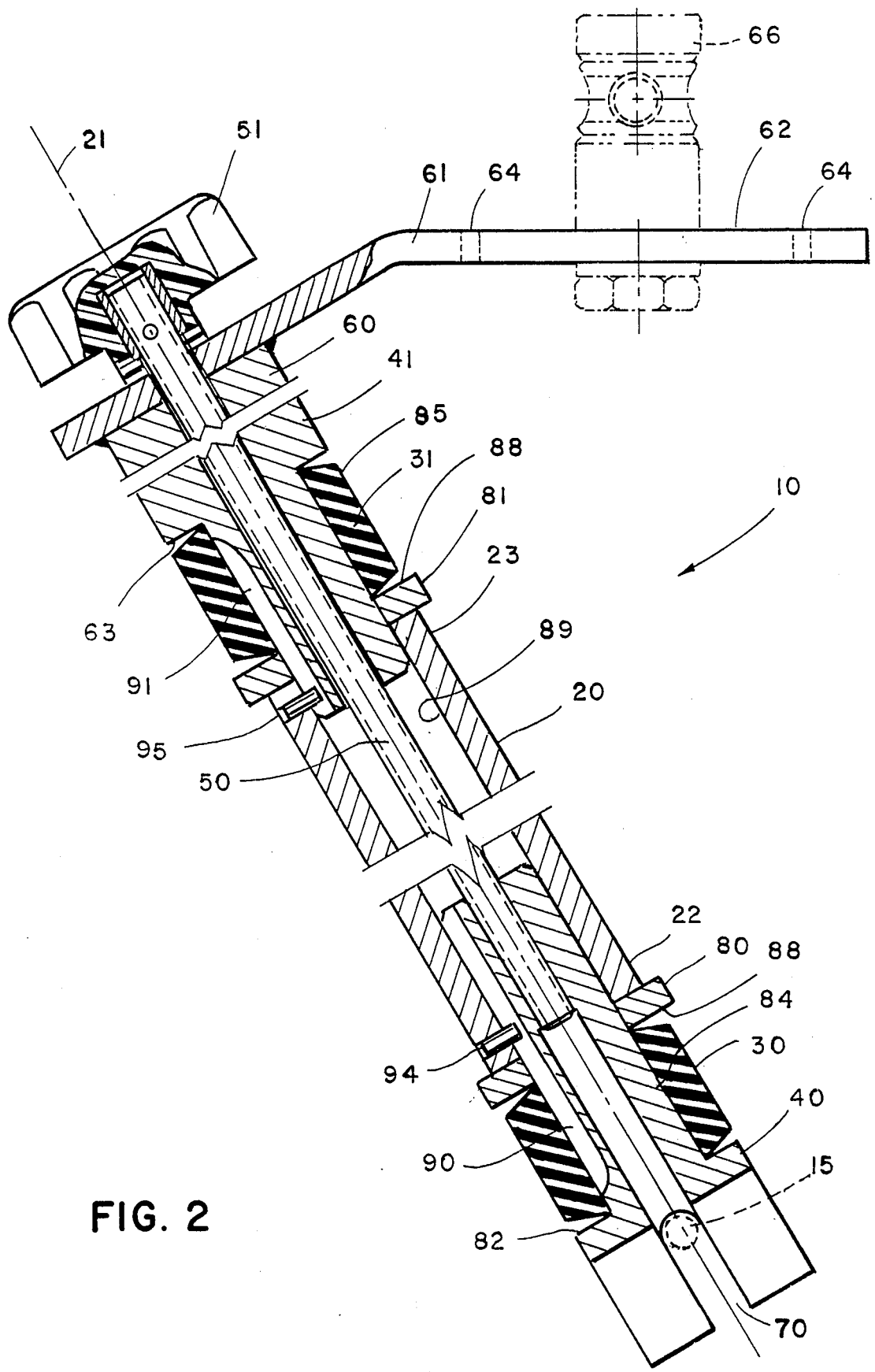
FIG. 2 is an elevational view, partially in section, of the rod holder adapter of the present invention.

With particular reference now to FIG. 2, the rod holder adapter of the present invention comprises an elongate cylindrical sleeve 20, which is adapted for insertion axially in the cylindrical rod holder 12. The axial direction is defined by the axis 21 and the radial direction is normal thereto. The elongate sleeve 20 includes a distal end 22 and a proximate end 23. The distal and proximate ends 22 and 23 are normally disposed within the rod holder 12. A first elastomeric ring is disposed at the distal end 22 of the sleeve 20 and a second elastomeric ring 31 is disposed at the proximate end 23 of the sleeve 20. A distal end plug 40 is slidably received in the distal end 22 of the sleeve 20 and a proximate end plug 41 is similarly received in the proximate end 23 of the sleeve 20. The elastomeric rings 30 and 31 are disposed between the ends 22 and 23 of the sleeve 20 and the plugs 40 and 41, respectively. An elongate, threaded shaft or fastener 50 is slidably received in the proximate plug 41 and is threaded into the distal plug 40 so that the plugs can be axially displaced by manual adjustment of hand knob 51. Axial displacement of the end plugs 40 and 41 compresses the elastomeric rings 30 and 31 between the end plugs and the ends 22 and 23, respectively, of the sleeve 20 to cause the elastomeric rings to swell or bulge in a radial direction such that the rings expand against and frictionally engage the interior walls of the cylindrical rod holder 12. The proximate end plug 41 includes a portion 60 which extends outside of the rod holder 12, and upon which an accessory mounting plate 61 is attached. The plate 61 extends above the rod holder adapter 10 and the rod holder 12 to form a horizontal surface 62 upon which a trolling device or other accessory is suitably fastened. For example, a downrigger 65 may be mounted on the surface 62 with a plurality of thumb screws 63 which engage threaded apertures 64 disposed in the plate 61. Another common mounting arrangement involves the provision of a centrally located snap-on and snap-off post (illustrated in phantom at 66 in FIG. 2) which is centrally located on the plate 61.

With particular reference now to FIG. 2, it is illustrated that the distal end plug 40 may be provided with cross slots such as the slot 70 within which a radially extending pin, such as the pin illustrated in phantom at 15, may be engaged. In rod holders where such a radially extending pin is provided, it improves the stability of the device to have the cross slots disposed on distal end plug 40 engage such a pin.

In embodiments of the invention where the rod holder is provided with a right circular, cylindrical interior cavity, it is often desirable to provide a distal spacer washer 80 and a proximate spacer washer 81. The distal and proximate spacer washers are provided with a circular cross section that is substantially the same or slightly less than the circular cross section of the internal cavity of the rod holder. The distal and proximate spacers are slidably received on the distal and proximate end plugs 40 and 41, respectively, and are preferably disposed between the first and second rings 30 and 31, and the distal and proximate ends 22 and 23 of the sleeve 20, respectively. In another embodiment of the invention, where particularly high loads are anticipated it may be desirable to split the sleeve 20 and insert a third elastomeric ring.

The end plugs 40 and 41 are provided with annular shoulders 82 and 83 which face the distal and proximate ends 22 and 23, respectively, of the sleeve 20. The end plugs 40 and 41 further include a cylindrical area of reduced cross section at 84 and 85 which slidably receive the rings 30 and 31, respectively, so that the rings are pressed between the annular surfaces 82 and 83 and the ends 22 and 23, respectively, of the sleeve 20. In cases where the spacers 80 and 81 are desired, these spacers are also slidably received on the cylindrical portions 84 and 85 of the end plugs 40 and 41, respectively. In this case, the spacers abut the ends 22 and 23 of the sleeve 20 and the elastomeric rings 84 and 85 engage the flat annular surfaces 88 of the spacers 80 and 81.

The cylindrical portions of end plugs 84 and 85 are slidably received within the cylindrical interior 89 of the tubular sleeve 20. Both the distal and proximate end plugs 40 and 41 are keyed to the sleeve 20 to prevent rotation of the end plugs relative to the sleeve. More particularly, the end plugs 40 and 41 are provided with keyways 90 and 91, which extend axially along the cylindrical portions 84 and 85 of the end plugs. Relative rotation of the end plugs and the sleeve is prevented by the insertion of roll pins 94 and 95 through the sleeve 20 such that the roll pins are trapped in keyways 90 and 91, respectively.

Figure 1:
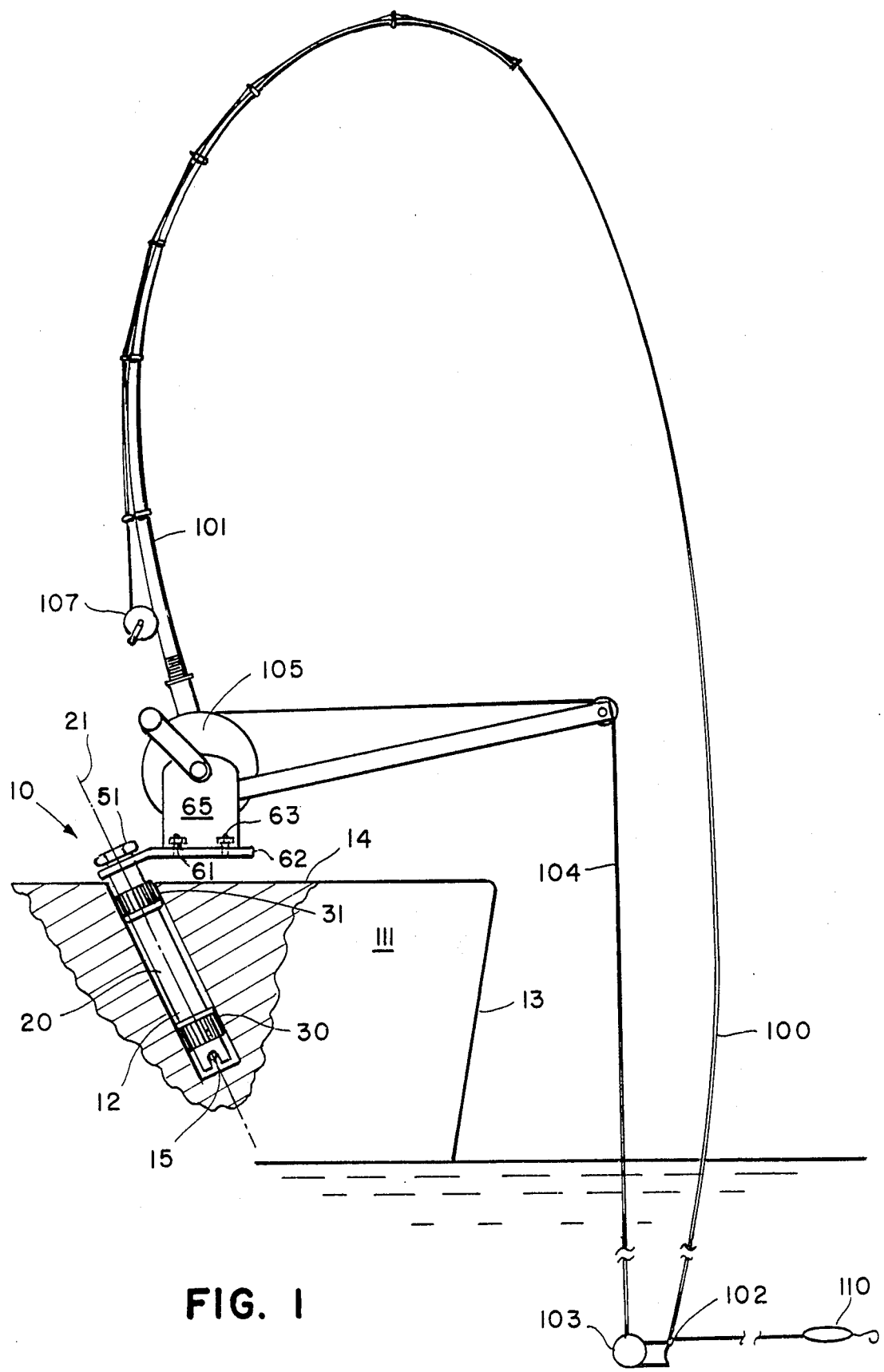
FIG. 1 is an elevational view, partially in section, of the rod holder adapter of the present invention mounted in the gunnels of a fishing boat with a downrigger trolling device mounted thereon.

The operation of the rod holder adapter of the present invention is best illustrated with reference to FIG. 1. In FIG. 1, a downrigger 65 is attached to the transom or gunnel of a boat 11 with the rod holder adapter generally illustrated at 10. This is accomplished by loosening the knob or hand wheel 51 on rod holder adapter 10 an amount sufficient to permit axial insertion of cylindrical sleeve 20 of the rod holder 10 in flush mounted rod holder 12. The sleeve 20 must be inserted a sufficient distance so that the elastomeric rings 30 and 31 are disposed within the cylindrical interior cavity of the flush mounted rod holder 12. Since the rod holders are normally provided with an angle relative to the vertical, the accessory mounting plate 16 is aligned so that a horizontal surface 62 is presented, upon which the downrigger 65 is to be mounted. In cases where a radial pin 15 is provided at the bottom of the flush mounted rod holder 12, it is normally desirable to engage the pin 15 with one of the cross slots disposed on the distal end plug 40 of the rod holder adapter. Once the angular orientation of the mounting plate 61 is achieved, the rod holder adapter is firmly secured within the flush mounted rod holder 12 by tightening hand knob 51 to cause first and second elastomeric rings 30 and 31 to swell and firmly frictionally engage the interior cavity of the flush mounted rod holder 12. The downrigger 65 is then suitably secured to the horizontal mounting surface 62 of the plate 61 with a plurality of thumb screws 63 or the like. Thereafter, the downrigger is used in a conventional trolling operation where a line 100, from a fishing rod 101, is attached to a release 102 on a weight 103, which is suspended by a wire or other suitable stout line 104, the depth of which is controlled by a hand or motor actuated reel 105 disposed on the downrigger 65. In the operation of this type of trolling device, the butt end of the rod 101 is disposed in a rod holder provided with the trolling device, a suitable length of line and lure 110 are let out from the stern of the boat while the weight 103 is on the surface. Once a suitable length of line is let out to separate the lure and the weight, the line is attached with line release 102 to the weight 103. Thereafter, with the drag set at a relatively light setting on a reel 107 on rod 101, the downrigger reel 105 is used to lower the weight 103 to a predetermined trolling depth. At that point, the reel 105 of the downrigger 65 is fixed and the drag on the fishing reel 107 is increased to a level suitable for the target fish. When the lure 110 is struck, the combined tension of the fish and the preload tension of the rod 101 cause the release of the line 100 from the weight 103 to allow the sport fisherman to fight the target fish without the encumbrance of the trolling weight 103.

The above description is exemplary and should be considered that of the preferred embodiment only. Modifications will occur to those who make and use the invention. It is desired to include within the scope of the present invention all such modifications that come within the proper scope of the appended claims.

The emodiments of the invention in which an exclusive property or privilege is claimed are defined as follows:

1. A rod holder adapter for mounting fishing accessories on a boat in a flush mounted rod holder comprising:
   an elongate sleeve for insertion axially in the rod holder, said elongate sleeve having a distal end and a proximate end disposed within the rod holder;
   a distal end plug slidably received in the distal end of said elongate sleeve, wherein said distal end plug is provided with cross slots for engaging a radially extending pin disposed in the bottom of the rod holder;

a first elastomeric ring disposed adjacent said distal end of said sleeve;

a second elastomeric ring disposed adjacent said proximate end of said sleeve;

a device mount connected adjacent said proximate end of said sleeve and extending over the rod holder for receiving a fishing accessory; and means for axially compressing said first and second elastomeric rings to cause said rings to swell in a radial direction and firmly engage the rod holder.

2. The rod holder adapter of claim 1 wherein said elongate sleeve comprises a circular, cylindrical, tube.

3. A rod holder adapter for mounting fishing accessories on a boat in a flush mounted rod holder comprising:

a circular, cylindrical tube for insertion axially in the rod holder, said circular, cylindrical tube having a distal end and a proximate end disposed within the rod holder;

a first elastomeric ring disposed adjacent said distal end of said circular, cylindrical tube;

a first elastomeric ring disposed adjacent said proximate end of said circular, cylindrical tube;

a device mount disposed adjacent said proximate end of said circular, cylindrical tube and extending over the rod holder for receiving a fishing accessory;

a distal end plug slidably received in the distal end of said circular, cylindrical tube, said first elastomeric ring being disposed between said distal end plug and said distal end of said circular, cylindrical tube;

a proximate end plug slidably received in the proximate end of said circular, cylindrical tube, said second elastomeric ring being disposed between said proximate end plug and said proximate end of said circular, cylindrical tube; and a threaded fastener slidably received in said proximate end plug and threadably engaging said distal end plug whereby said first and second elastomeric rings are compressed causing said rings to swell in a radial direction to firmly engage the rod holder and the axial separation of said proximate and distal end plugs is adjusted by rotation of said threaded fastener.

4. The rod holder adapter of claim 3 wherein said proximate end plug extends outside of said rod holder and said device mount is disposed thereon.

5. The rod holder adapter of claim 4 wherein said distal end plug is provided with cross slots for engaging a radially extending pin disposed in the bottom of the rod holder.

6. The rod holder adapter of claim 3 wherein said threaded fastener is provided with a hand knob, whereby the rod holder adapter is manually inserted in the rod holder and the hand knob is manually tightened to axially compress said first and second elastomeric rings and firmly engage the rod holder.

7. The rod holder adapter of claim 3 wherein said distal and proximate end plugs are provided with annular shoulders facing said circular, cylindrical tube and said elastomeric rings are slidably received on the portions of said end plugs received in said circular, cylindrical tube, whereby said elastomeric rings are compressed between said annular shoulders and said circular, cylindrical tube.

8. The rod holder adapter of claim 7 wherein the rod holder is provided with a cavity having circular, cylindrical cross section and a distal spacer washer is provided between said distal end plug and the distal end of said circular, cylindrical tube; and a proximate spacer washer is provided between said proximate end plug and the proximate end of said circular, cylindrical tube, said distal and proximate spacer washers being provided with a circular cross section substantially matching or slightly less than the circular cross section of the rod holder.

9. The rod holder adapter of claim 3 wherein said distal and said proximate end plugs are keyed to said circular, cylindrical tube to prevent rotation of said end plugs relative to said circular, cylindrical tube.

10. The rod holder adapter of claim 9 wherein said distal and said proximate end plugs are provided with axially extending keyways and a plurality of roll pins are provided which extend through said circular, cylindrical tube and slidably engage said keyways.

* * * * *

UNITED STATES PATENT AND TRADEMARK OFFICE
CERTIFICATE OF CORRECTION

PATENT NO. : 4,716,674
DATED : January 5, 1988
INVENTOR(S) : James A. Kammeraad

It is certified that error appears in the above-identified patent and that said Letters Patent is hereby corrected as shown below:

Column 1, lines 1 and 2:
 "ROD HOLDER ADAPTERc1 BACKGROUND OF THE INVENTION" should be
 -- ROD HOLDER ADAPTER
 BACKGROUND OF THE INVENTION --;

Column 2, line 68:
 "ends 22 and 23." should be -- ends 22 and 23, --;

Column 5, Claim 3, line 24:
 "a first" should be -- a second --.

Signed and Sealed this

Thirteenth Day of September, 1988

Attest:

DONALD J. QUIGG

Attesting Officer     Commissioner of Patents and Trademarks